US009306716B2

(12) United States Patent
Mittelsteadt et al.

(10) Patent No.: US 9,306,716 B2
(45) Date of Patent: Apr. 5, 2016

(54) CARRIER TRACKING WITHOUT PILOTS

(71) Applicant: ViXS Systems, Inc., Toronto (CA)

(72) Inventors: Cimarron Mittelsteadt, Santa Clarita, CA (US); Cheng-Chou Lan, Los Angeles, CA (US)

(73) Assignee: ViXS Systems, Inc., Toronto, ON (CA)

( * ) Notice: Subject to any disclaimer, the term of this patent is extended or adjusted under 35 U.S.C. 154(b) by 0 days.

(21) Appl. No.: 14/330,117

(22) Filed: Jul. 14, 2014

(65) Prior Publication Data
US 2014/0321403 A1 Oct. 30, 2014

Related U.S. Application Data

(63) Continuation of application No. 13/299,757, filed on Nov. 18, 2011, now Pat. No. 8,780,838.

(51) Int. Cl.
H04W 4/00 (2009.01)
H04L 5/00 (2006.01)
H04L 27/26 (2006.01)

(52) U.S. Cl.
CPC ............. H04L 5/0046 (2013.01); H04L 5/006 (2013.01); H04L 5/0042 (2013.01); H04L 5/0053 (2013.01); H04L 27/2657 (2013.01); H04L 27/2679 (2013.01); H04L 5/0007 (2013.01); H04L 5/0094 (2013.01)

(58) Field of Classification Search
None
See application file for complete search history.

(56) References Cited

U.S. PATENT DOCUMENTS

| 5,875,215 | A | 2/1999 | Dobrica |
| 5,920,598 | A | 7/1999 | Hyakudai et al. |
| 6,122,247 | A | 9/2000 | Levin et al. |
| 6,178,194 | B1 | 1/2001 | Vasic |
| 6,304,624 | B1 | 10/2001 | Seki et al. |
| 6,442,222 | B1 | 8/2002 | Ghazi-Moghadam et al. |
| 6,901,125 | B2 | 5/2005 | Ghazi-Moghadam et al. |
| 7,009,932 | B2 | 3/2006 | Matheus et al. |
| 7,428,285 | B2 | 9/2008 | Ghazi-Moghadam et al. |
| 2003/0231718 | A1 | 12/2003 | Jiang |
| 2005/0111590 | A1 | 5/2005 | Fang et al. |
| 2005/0123028 | A1 | 6/2005 | Cioffi et al. |
| 2005/0157670 | A1 | 7/2005 | Tang et al. |
| 2005/0213678 | A1 | 9/2005 | Lewis |

(Continued)

FOREIGN PATENT DOCUMENTS

FR 2721778 A1 6/1994

OTHER PUBLICATIONS

CTE Implication Paper, "The Challenges and Rewards of MoCA Deployment for the Home Network," An Implication paper prepared for the Society of Cable Telecommunications Engineers by Spirent Communications, http://mocalliance.org/marketing/white_papers/Spirent_white_paper.pdf, pp. 1-29, downloaded Aug. 30, 2011.

(Continued)

Primary Examiner — Otis L Thompson, Jr.
(74) Attorney, Agent, or Firm — Abel Law Group, LLP

(57) ABSTRACT

A carrier tracking technique includes allocating a first number of bits per symbol to a carrier tracking subcarrier of a plurality of subcarriers of an orthogonal frequency division multiplexing (OFDM) signal based on a first target performance margin. The technique includes allocating numbers of bits per symbol to other subcarriers of the plurality of subcarriers based on a second target performance margin.

18 Claims, 9 Drawing Sheets

(56) References Cited

U.S. PATENT DOCUMENTS

| | | |
|---|---|---|
| 2006/0133529 A1 | 6/2006 | Lee et al. |
| 2006/0140308 A1 | 6/2006 | MacFarlane Shearer et al. |
| 2006/0182015 A1 | 8/2006 | Kim |
| 2007/0110176 A1 | 5/2007 | Wu et al. |
| 2008/0068978 A1 | 3/2008 | Clausen |
| 2008/0151989 A1 | 6/2008 | Von Elbwart et al. |
| 2008/0225998 A1 | 9/2008 | Fu |
| 2008/0232490 A1 | 9/2008 | Gross et al. |
| 2008/0285510 A1 | 11/2008 | Thyagarajan et al. |
| 2009/0135934 A1 | 5/2009 | Guerrieri et al. |
| 2009/0161780 A1 | 6/2009 | Schneider et al. |
| 2009/0190537 A1 | 7/2009 | Hwang et al. |
| 2009/0257454 A1 | 10/2009 | Maltsev et al. |
| 2009/0310708 A1 | 12/2009 | Cheng et al. |
| 2011/0243203 A1 | 10/2011 | Yamamoto et al. |
| 2012/0201178 A1 | 8/2012 | Thyagarajan et al. |
| 2012/0275539 A1 | 11/2012 | Maltsev et al. |
| 2014/0044038 A1 | 2/2014 | Zhang et al. |

OTHER PUBLICATIONS

Chow, Peter S., et al., "DMT-Based ADSL: Concept, Architecture, and Performance," The Institute of Electrical Engineers, 1994, 6 pages, IEE, London, UK.

Litwin, Louis, "Matched filtering and timing recovery in digital receivers," RF time and frequency, Sep. 2001, pp. 32, 36, 40, 42, 44, 46, and 48.

Halford, Steve and Halford, Karen, "OFDM Uncovered Part 2: Design Challenges," http://www.eetimes.com/General/DisplayPrintViewContent?contentItemID=4142294, downloaded Oct. 18, 2011, 4 pages.

Luise, Marco and Reggiannini, Ruggero, "Carrier Frequency Acquisition and Tracking for OFDM Systems," IEEE Transactions on Communications, vol. 44, No. 11, Nov. 1996, pp. 1590-1598.

Mueller, Kurt H. and Müller, Markus, "Timing Recovery in Digital Synchronous Data Receivers," IEEE Transactions on Communications, vol. Com-24, No. 5, May 1976, pp. 516-531.

Negi, Rohit and Cioffi, John, "Pilot Tone Selection for Channel Estimation in a Mobile OFDM System," IEEE Transactions on Consumer Electronics, vol. 44, No. 3, Aug. 1998, pp. 1122-1128.

Ovadia, Shlomo, "Home Networking on Coax for Video and Multimedia," Overview for IEEE 802.1AVB, Multimedia over COAX Alliance, May 30, 2007, pp. 1-15.

Talbot, Scott L. and Farhang-Boroujeny, Behrouz, "Spectral Method of Blind Carrier Tracking for OFDM," IEEE Transactions on Signal Processing, vol. 56, No. 7, Jul. 2008, pp. 2706-2716.

European Search Report for Application No. 12191498 dated Aug. 16, 2013, 12 pages.

Fusco, T., and Tanda, M., "A Data-Aided Symbol Timing and Frequency Offset Estimation Algorithm for OFDM Systems," Wireless Personal Communications (2005) 35, pp. 201-212.

Shi, Kai et al., "Decision-Directed Fine Synchronization in OFDM Systems," IEEE Transactions on Communications, vol. 53, No. 3, Mar. 2005, pp. 408-412.

CARRIER TRACKING WITHOUT PILOTS

CROSS-REFERENCE TO RELATED APPLICATION(S)

This application is a continuation of U.S. patent application Ser. No. 13/299,757, filed Nov. 18, 2011, entitled "Carrier Tracking Without Pilots," naming Cimarron Mittelsteadt and Cheng-Chou Lan as inventors, which application is hereby incorporated by reference.

BACKGROUND

1. Field of the Invention

The present invention relates to communications systems, and more particularly to carrier tracking in communications systems.

2. Description of the Related Art

In a typical orthogonal frequency division multiplexing (OFDM) communications system, a carrier frequency oscillator used to modulate a baseband signal in a transmitter of the communication system is independent from a carrier frequency oscillator used by a receiver to demodulate the baseband information from a received modulated signal. In addition, channel effects introduce frequency offset (i.e., a difference in frequency of a transmitted subcarrier and a received subcarrier) into a received OFDM signal. A frequency offset between a received subcarrier and a frequency of a transmitted subcarrier may result in amplitude reduction of a received symbol and loss of orthogonality between subcarriers of the received OFDM signal, which results in intercarrier interference. To avoid severe system performance degradation, any uncompensated frequency offset must not exceed a small fraction of the subcarrier signaling rate. However, small carrier offsets (i.e., on the order of a percentage of the subcarrier spacing) can severely degrade OFDM demodulation.

SUMMARY OF EMBODIMENTS OF THE INVENTION

In at least one embodiment of the invention, a method includes communicating data using an orthogonal frequency division multiplexing (OFDM) signal having a first number of bits per symbol of data modulating a carrier tracking subcarrier of a plurality of subcarriers of the OFDM signal and numbers of bits per symbol of data modulating the other subcarriers of the plurality of subcarriers. The first number of bits per symbol is based on a performance estimate for the carrier tracking subcarrier and a number of bits that provides a first target performance margin. The numbers of bits per symbol are based on corresponding performance estimates for the other subcarriers and corresponding numbers of bits that provide a second target performance margin.

In at least one embodiment of the invention, an apparatus includes a select module configured to select a carrier tracking subcarrier from a plurality of subcarriers of an OFDM signal based on a plurality of corresponding performance estimates for the plurality of subcarriers. The apparatus includes a bit allocation module configured to allocate a number of bits per symbol to the carrier tracking subcarrier based on a performance estimate for the carrier tracking subcarrier and a first target performance margin and configured to allocate numbers of bits per symbol to other subcarriers of the plurality of subcarriers based on corresponding performance estimates for the other subcarriers and a second target performance margin. The first target performance margin may be substantially greater than the second target performance margin.

In at least one embodiment of the invention, a method includes allocating a first number of bits per symbol to a carrier tracking subcarrier of a plurality of subcarriers of an OFDM signal based on a first target performance margin. The method includes allocating numbers of bits per symbol to other subcarriers of the plurality of subcarriers based on a second target performance margin.

In at least one embodiment of the invention, an apparatus includes a select module configured to select a carrier tracking subcarrier from a plurality of subcarriers of an OFDM signal based on performance estimates for the plurality of subcarriers. The apparatus includes a bit allocation module configured to allocate a number of bits per symbol to the carrier tracking subcarrier based on a first target performance margin. The bit allocation module is configured to allocate numbers of bits per symbol to other subcarriers of the plurality of subcarriers based on a second target performance margin.

In at least one embodiment of the invention, a method includes communicating an OFDM signal over a channel. A carrier tracking subcarrier of a plurality of subcarriers of the OFDM signal is modulated by a first number of data bits per symbol. Other subcarriers of the plurality of subcarriers are modulated by numbers of data bits per symbol. The first number of data bits per symbol is based on a first target performance margin. The numbers of data bits per symbol are based on a second target performance margin.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
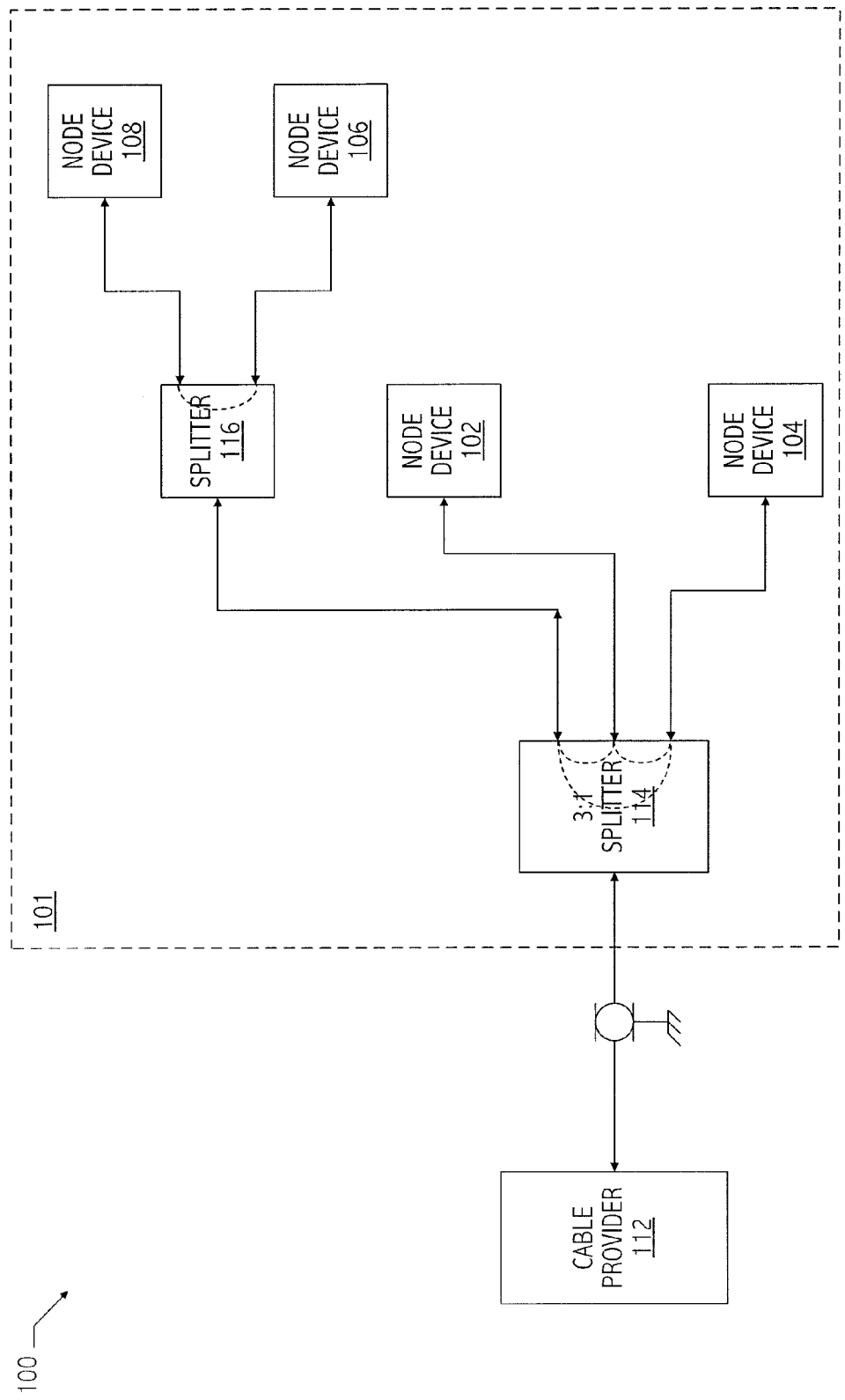
FIG. 1 illustrates a functional block diagram of an exemplary communications system.

Referring to FIG. 1, in an exemplary digital communications network (e.g., network 100) nodes (e.g., nodes 102, 104, 106, and 108) and splitters (e.g., splitters 114 and 116) are configured as a local area network (e.g., network 101) using communications over a channel (e.g., coaxial cables). In at least one embodiment of network 100, nodes 102, 104, 106, and 108 communicate with a wide-area network (e.g., cable provider-112) via splitter 114 and/or splitter 116. In addition, in at least one embodiment of network 100, nodes 102, 104, 106, and 108 communicate with each other via splitter jumping.

Figure 2:
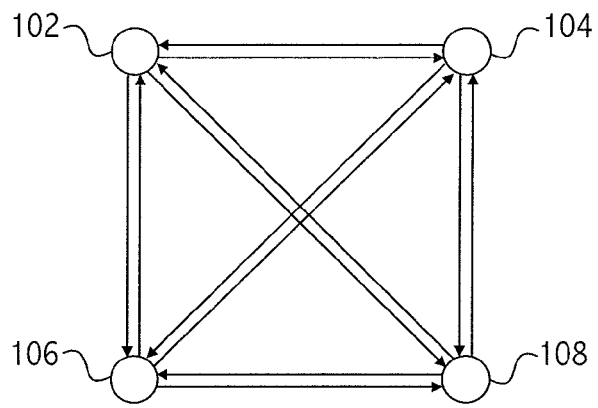
FIG. 2 illustrates an exemplary logical topology of node devices of the communications system of FIG. 1.

Note that due to effects of splitter jumping and reflections at different terminations of network 101, channel characteristics (e.g., attenuation and delay) for a link between two nodes may be different from the channel characteristics for a link between two other nodes. In addition, channel characteristics in a forward path may be different from channel characteristics in a reverse path. Thus, channel capacity between each source node and destination node varies from the channel capacity for two other source nodes and destination nodes. Accordingly, to appropriately use channel capacity of network 101, individual nodes of network 101 determine and store suitable separate physical (PHY) parameters tailored for each link (i.e., store separate PHY profiles for each link). Referring to FIG. 2, a logical model of network 101 is a fully-meshed collection of point-to-point links. Each link has unique channel characteristics and capacity. In addition to point-to-point communications, network 101 supports broadcast and multicast communications in which a source node uses a common set of PHY parameters that may be received by all destination nodes.

In at least one embodiment of network 101, nodes 102, 104, 106, and 108 share a physical channel. Thus, only one node is allowed to transmit at a particular time. For example, the physical channel is time division-duplexed and coordinated by a Media Access Control (MAC) data communication protocol sublayer using time division multiple access (TDMA). In at least one embodiment, network 101 is a centrally coordinated system with one node being a network-coordinator (NC). A node that is the NC transacts data on the network like any other node, but is also responsible for transmitting beacons to advertise network presence and timing, coordinating a process for admitting nodes to the network, scheduling and coordinating transmission of data among all nodes in the network, scheduling and coordinating link-maintenance operations (e.g., operations during which nodes update their physical profiles), and other functions.

Figure 3:
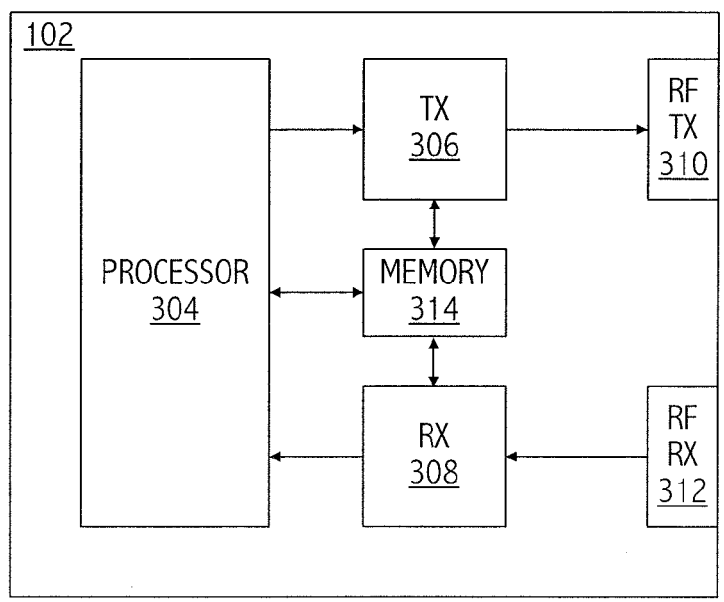
FIG. 3 illustrates a functional block diagram of an exemplary node device of the communications system of FIG. 1.

Referring to FIG. 3, an exemplary node 102 includes a processor configured to generate and process data communicated over network 101. Data to be transmitted over the network is digitally processed in transmitter 306 and transmitted over the channel using RF transmitter 310. In at least one embodiment, node 102 includes a radio frequency receiver configured to receive analog signals over the channel and to provide a baseband analog signal to the receiver path (e.g., receiver 308), which digitally processes the baseband signal to recover data and control information symbols and provide it to processor 304.

In at least one embodiment, network 101 implements orthogonal frequency division multiplexing (OFDM). In general, OFDM is a frequency-division multiplexing scheme utilized as a digital multi-carrier modulation method in which a large number of orthogonal subcarriers having closely-spaced frequencies are used to carry data. The data is divided into several parallel data streams or channels (i.e., frequency bins or bins), one for each sub-carrier. Each subcarrier is modulated with a conventional modulation scheme (e.g., quadrature amplitude modulation or phase shift keying) at a low symbol rate, maintaining total data rates similar to conventional single-carrier modulation schemes in the same bandwidth. In at least one embodiment of node 102, the physical interface (e.g., transmitter 306 and receiver 308) utilizes adaptive constellation multi-tone (ACMT), i.e., node 102 pre-equalizes modulation to the frequency response of each link using bit loaded orthogonal frequency division multiplexing (OFDM). In addition, channel profiling techniques tailor the modulation for each link. In at least one embodiment of node 102, physical layer channels are approximately 50 MHz wide (i.e., the ACMT sampling rate is approximately 50 MHz) and the total number of OFDM subcarriers is 256. However, other sampling rates and numbers of subcarriers may be used. In at least one embodiment of node 102, due to DC and channel edge considerations, only 224 of the 256 subcarriers are available for typical communications.

In at least one embodiment of node 102, a modulation profile is generated based on probe packets sent between nodes and analyzed at the receiving nodes. After analysis, a receiving node assigns bits to subcarriers for a particular link and communicates this information to node 102. An individual ACMT subcarrier may be active or inactive (i.e., turned off). An active ACMT subcarrier is configured to carry one to eight bit Quadrature Amplitude Modulation (QAM) symbols. In at least one embodiment of node 102, transmit power of a sending node is dynamically adjusted based on modulation profiling using the probe packets and based on link performance.

In general, the channel is time-varying and link maintenance operations (LMOs) facilitate the recalculation of PHY parameters. Thus, at regular intervals a transmitting node sends one or more probe packets which are received and analyzed by receiving nodes. The receiving nodes send back probe reports to the corresponding transmitting nodes. Those probe reports may include updated parameters. In at least one embodiment of node 102, each probe packet includes a preamble and a payload. In at least one embodiment of node 102, multiple probe types are used for characterization of different network elements. In at least one embodiment of node 102, probe and/or payload packets include a preamble that includes one or more symbols used for channel estimation.

Figure 4:
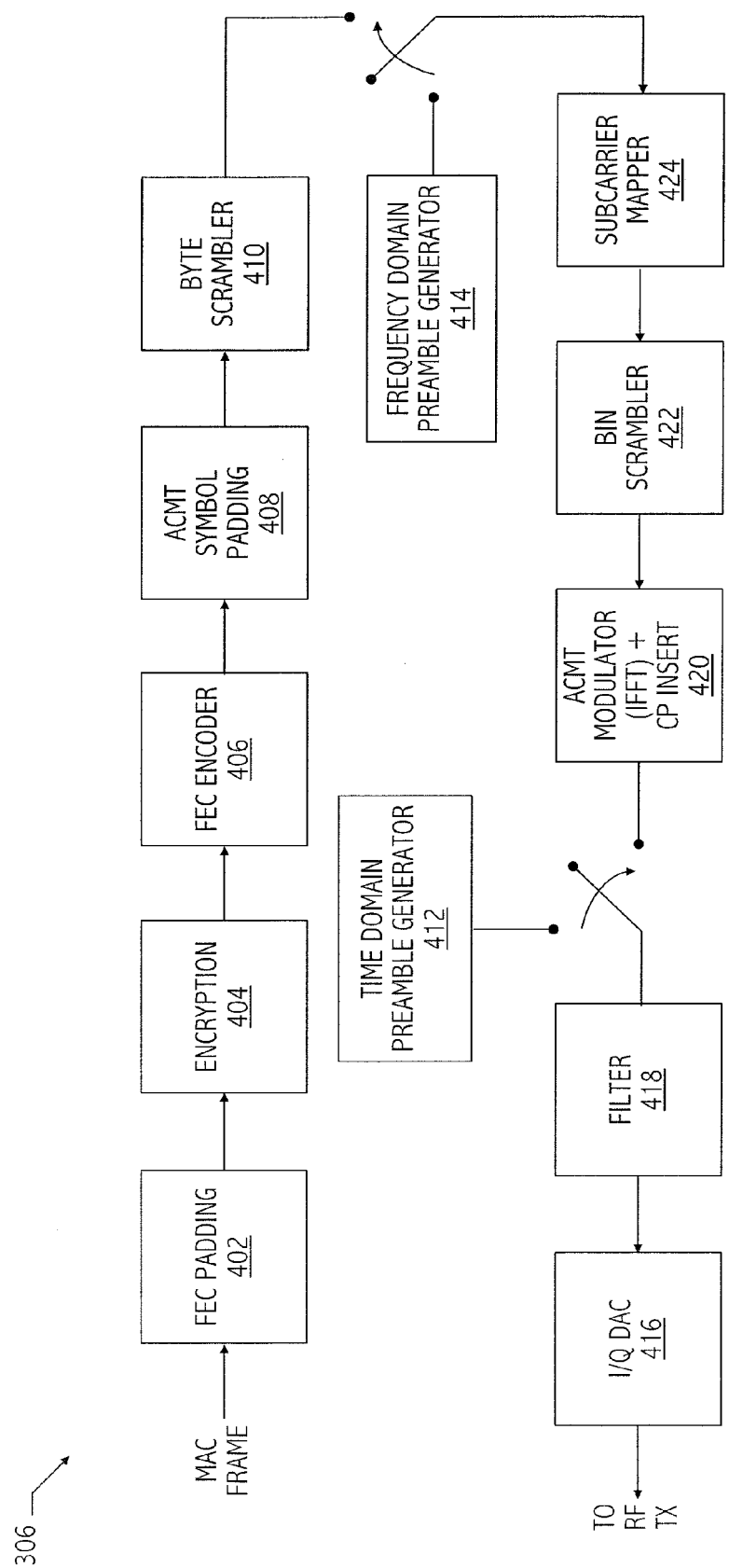
FIG. 4 illustrates a functional block diagram of an exemplary transmitter path of the node device of FIG. 3, consistent with at least one embodiment of the invention.

Referring to FIG. 4, in at least one embodiment, transmitter 306 receives a frame of data from a Medium Access Control data communication protocol sub-layer (i.e., MAC layer). In at least one embodiment of transmitter 306, a channel coding module (e.g., FEC padding module 402) encodes the MAC frame with redundancies using a predetermined algorithm to reduce the number of errors that may occur in the message and/or allow correction of any errors without retransmission. In at least one embodiment of transmitter 306, an encryption module (e.g., encryption module 404) encrypts the frame to deter eavesdropping and provide link layer privacy. In at least one embodiment, encryption module 404 implements 56-bit Data Encryption Standard (DES) encryption using a privacy key generated and received from the NC. However, in other embodiments of transmitter 306, other encryption techniques may be used.

In at least one embodiment of transmitter 306, an encoder (e.g., forward error correction (FEC) encoder 406) encodes the frame into two Reed-Solomon codewords including a regular codeword and a shortened codeword to reduce the FEC padding. Note that in other embodiments of transmitter 306, other types of forward error correction are used (e.g., other block codes or convolutional codes). In at least one embodiment of transmitter 306, a padding module (e.g., ACMT symbol padding module 408) inserts additional bits into the data to form symbols having a particular ACMT symbol size. In at least one embodiment of transmitter 306, a scrambler module (e.g., byte scrambler 410) scrambles the data across multiple bytes to change the properties of the transmitted data stream. For example, byte scrambler 410 facilitates data recovery by reducing dependence of the signal power spectrum on the actual transmitted data and/or reducing or eliminating occurrences of long sequences of '0' or '1' that may otherwise cause saturation of digital circuitry and corrupt data recovery. In at least one embodiment of transmitter 306, an ACMT subcarrier mapping module (e.g., subcarrier mapper 424) maps bits of data to ACMT subcarriers according to a predetermined bit loading profile (e.g., a bit loading profile received from a receiving node and stored in memory). In at least one embodiment of transmitter 306, the predetermined profile is selected from a plurality of predetermined profiles according to a particular mode or packet type (e.g., beacon mode, diversity mode, Media Access Plan (MAP), unicast, or broadcast) and link for transmission (e.g., a profile stored for a particular receiving node).

In at least one embodiment of transmitter 306, a scrambler module (e.g., bin scrambler 422) scrambles the data of the ACMT subcarriers to change the properties of the transmitted data stream (e.g., reduce dependence of the signal power spectrum on the actual transmitted data or to reduce or eliminate occurrences of long sequences of '0' or '1') to properties that facilitate data recovery. A modulator (e.g., ACMT modulator 420) generates the time domain in-phase and quadrature (i.e. I and Q) components corresponding to the OFDM signal. ACMT modulator 420 includes an N-point IFFT and inserts a cyclic prefix to the modulated data (i.e. inserts the cyclic prefix to time domain symbols). For example, ACMT modulator 420 copies the last $N_{CP}$ samples of the IFFT output (e.g., N samples) and prepends those samples to the IFFT output to form an OFDM symbol output (e.g., $N+N_{CP}$ samples). The cyclic prefix is used as a guard interval to reduce or eliminate intersymbol interference from a previous symbol and also to facilitate linear convolution of the channel to be modeled as a circular convolution, which may be transformed to the frequency domain using a discrete Fourier transform. This approach allows for simple frequency-domain processing, such as for channel estimation and equalization. The length of the cyclic prefix is chosen to be at least equal to the length of the multipath channel. In at least one embodiment of transmitter 408, filter 418 limits the frequency band of the signal to a signal having a particular spectral mask prior to digital-to-analog conversion (e.g., by digital-to-analog converter 416) and any frequency modulation to a higher frequency band (e.g., from baseband to one of four frequency bands in the range of 850 MHz to 1525 MHz at 25 MHz increments) for transmission.

Depending upon a particular communication type, in at least one embodiment of transmitter 306, frequency domain preamble generator 414 or time domain preamble generator 412 inserts a preamble into the packet prior to processing a MAC frame of data. For example, rather than processing a MAC frame through the portion of the transmitter path including FEC padding module 402, encryption module 404, FEC encoder 406, ACMT symbol padding module 408, and byte scrambler 410, an alternate source (e.g., frequency domain preamble generator 414) provides a plurality of frequency domain preamble symbols, including one or more frequency domain symbols (e.g., which are generated or retrieved from a storage device) to subcarrier mapper 424. Subcarrier mapper 424 maps bits of those frequency domain preamble symbols to individual subcarriers. Those frequency domain preamble symbols are then processed by the remainder of transmitter 306 (e.g. bin scrambled, ACMT modulated, filtered, and converted to an analog signal) and sent to RF TX 310 for transmission. The frequency domain preamble symbols provide a reference signal that may be used by the receiver for timing and frequency offset acquisition, receiver parameter calibration, and PHY payload decode. In at least one embodiment of transmitter 306, frequency domain preamble generator 414 provides a plurality of channel estimation frequency domain symbols (e.g. two channel estimation symbols) to subcarrier mapper 424, bin scrambler 422, ACMT modulator 420, filter 418, and DAC 416. In at least one embodiment of transmitter 306, time domain preamble generator 412 inserts a plurality of time domain symbols directly to filter 418 for digital-to-analog conversion and then transmission over the link. The time domain preamble symbols provide a reference signal that may be used by the receiver to identify packet type and for coarse timing and frequency offset acquisition.

Figure 5:
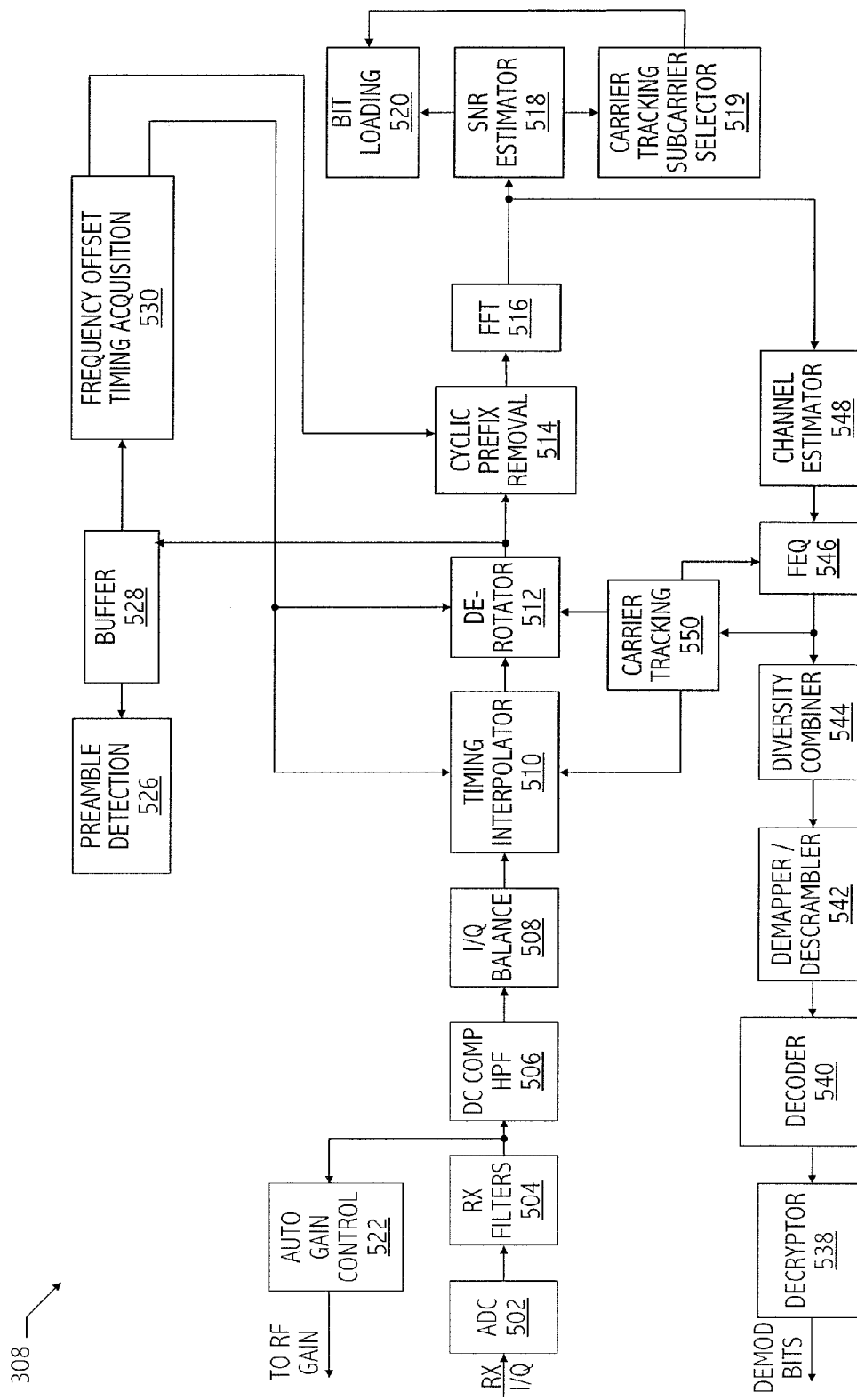
FIG. 5 illustrates a functional block diagram of an exemplary receiver path of the node device of FIG. 3, consistent with at least one embodiment of the invention.

Referring to FIG. 5, in at least one embodiment, receiver 308 receives an analog signal from the RF receiver interface (e.g., RF receiver 312 of FIG. 3) and analog-to-digital converter (e.g., ADC 502) converts in-phase and quadrature analog signal components of the received signal into a complex digital signal. Referring back to FIG. 5, in at least one embodiment of receiver 308, one or more filters (e.g., RX filters 504) limit the complex digital signal to a baseband signal having a particular bandwidth. In at least one embodiment of receiver 308, one or more other filters (e.g., high-pass filter 506) attenuates or removes a DC component of the complex digital signal. In at least one embodiment of receiver 308. I/Q balance module 508 adjusts the real and imaginary components of the complex baseband signal, which are balanced at the transmitting node, but become unbalanced after transmission over the channel by analog circuitry. I/Q balance module 508 adjusts the in-phase and quadrature components of the complex baseband signal to have approximately the same gain. In at least one embodiment of receiver 308, a timing module (e.g., timing interpolator module 510) adjusts the sample timing based on a timing offset, e.g., by using a delay filter to interpolate samples and generate an output sample having a particular timing based on the timing offset. In at least one embodiment of receiver 308, a frequency offset correction module (e.g., de-rotate module 512) compensates for any frequency offset, e.g., by performing a complex multiply of the received data with a complex data value based on a previously determined target angle of rotation that compensates for the frequency offset. In at least one embodiment of receiver 308, a module (e.g., cyclic prefix removal module 514) strips a number of samples (e.g., $N_{CP}$ samples, where $N_{CP}$ is the number of samples inserted by the transmitter as the cyclic prefix) from the de-rotated data symbol and provides the resulting time domain symbol to a demodulator (e.g. fast Fourier transform (FFT) module 516), which generates frequency domain symbols.

In at least one embodiment of receiver 308, during data demodulation and decode sequences, a frequency domain equalizer (e.g., FEQ 546) reduces effects of a bandlimited channel using frequency domain equalizer taps generated by a channel estimation module (e.g., channel estimator 548), as described further below. In at least one embodiment of receiver 308, during data demodulation and decode sequences that communicate in a diversity mode (e.g. a mode in which the same signal is transmitted by multiple subcarriers) diversity combiner module 544 combines signals repeated on multiple subcarriers into a single improved signal (e.g., using a maximum ratio combining technique). In at least one embodiment of receiver 308, frequency domain symbols are demapped from the subcarriers and descrambled (e.g., using demapper/descrambler module 542) according to a technique consistent with the mapping and scrambling technique used on a transmitting node. The demapped and descrambled bits are decoded (e.g., using decoder 540) consistent with coding used by a transmitting node. A decryption module (decryptor 538) recovers demodulated bits and provides them to a processor for further processing.

In at least one embodiment of receiver 308, during timing and frequency acquisition sequences, a gain control module (e.g., automatic gain control module 522) provides power adjustment signals to monotonically adjust analog gain of the RF receiver interface (e.g., RF receiver 312 of FIG. 3) using adjustments in a particular range and step size. Referring back to FIG. 5, in at least one embodiment of receiver 308, during timing and frequency acquisition sequences, the output of de-rotator 512 is stored in a storage device (e.g., buffer 528). The stored data is used to detect a preamble of a packet (e.g., using preamble detection module 526). In at least one embodiment, a frequency offset and timing acquisition module (e.g., frequency offset and timing acquisition module 530) generates an indication of a start of a symbol and an indication of a frequency offset for use by the receiver for recovery of subsequent received symbols (e.g., timing interpolator 510, de-rotator 512, and cyclic prefix removal module 514).

In at least one embodiment of receiver 308, during channel estimation sequences (e.g., during receipt of symbols of a probe signal) a signal-to-noise ratio (SNR) estimator (e.g., SNR estimator 518) generates an SNR estimate based on multiple frequency domain symbols. A bit loading module (e.g., bit loading module 520) assigns a number of bits for transmission over individual subcarriers of the OFDM channel based on the SNR estimate. For example, bit loading module 520 turns off an individual subcarrier or assigns a one to eight bit QAM symbol to the individual subcarrier. In general, bit loading module 520 generates a bit allocation for each subcarrier of an OFDM signal and receiver 308 communicates those bit loading assignments to a transmitting node for a particular link for generating packets for communication during data communications intervals. In addition, the resulting bit loading is stored in receiver 308 for data recovery during subsequent communications sequences.

In general, FEQ 546 reduces effects of a bandlimited channel by equalizing the channel response. In at least one embodiment of receiver 308, a payload packet includes a preamble portion that includes one or more symbols for channel estimation. A typical channel estimation symbol is generated using a pseudorandom number generator, obtained from a storage device, or generated using another suitable technique. In at least one embodiment of receiver 308, channel estimator 548 estimates the channel response based on received channel estimation symbols. Channel estimator 548 determines frequency domain equalizer coefficients based on that estimated channel response (i.e., channel response estimate) and provides the frequency domain equalizer coefficients to FEQ 546 for use during data demodulation and decode sequences.

In a typical OFDM system, a transmitter oscillator frequency and subcarrier frequencies are related by integers. A technique for synchronizing subcarriers at the receiver to subcarriers generated at a transmitting node uses at least one frequency offset determination during an acquisition interval (e.g., coarse and fine frequency offset determinations). For example, a coarse frequency offset determination technique resolves offsets greater than $V_2$ of the subcarrier spacing, and fine frequency offset determinations resolves offsets up to $V_2$ of the subcarrier spacing. In at least one embodiment of receiver 308, frequency offset and timing acquisition module 530 performs both coarse frequency acquisition and fine frequency acquisition to determine timing offsets and frequency offsets using known sequences received as part of a packet preamble. The coarse and fine frequency acquisition techniques use known symbols and require channel stationarity for the corresponding time interval. However, once the preamble of a packet is over, slight changes in the overall system may result in additional frequency offset. Accordingly, a carrier tracking module (e.g., carrier tracking module 550) implements a decision-directed, frequency tracking technique to determine frequency offsets for reliable data demodulation that compensates for the time-varying nature of carriers to achieve and maintain a target system performance level (e.g., target bit-error rate).

In an exemplary receiver 308, carrier tracking module 550 uses a pilot subcarrier ($n_P$) that carries known training data to synchronize the frequency and phase of the receiver clock with the transmitter clock. A typical pilot tone transmitted from the source node has only a real component (i.e., the imaginary component is zero) and the imaginary part of the complex output of subcarrier n from the FFT is input to a feedback loop on the receiver. That feedback loop is configured to adjust the receive clock signal to drive to zero the recovered imaginary part of the pilot tone. The imaginary part of the complex output of subcarrier $n_P$ from the FFT is input to a loop filter, which via a DAC delivers a digital control signal to de-rotator 512 and timing interpolator 510. However, in other embodiments of receiver 308, the output of the loop filter is a control voltage that is provided to a VCXO that adjusts the frequency of the receive clock. Note that transmitter 306 and receiver 308 are exemplary only and other transmitters and receivers consistent with teachings herein exclude one or more modules or include one or more additional modules in the transmit and receive paths, respectively.

As described above, a typical technique for carrier tracking during data demodulation and decode intervals uses training symbols communicated over pilot tones, which dedicate power for carrier tracking at the expense of signal power (i.e., the use of pilot tones results in a loss in data rate). Instead of dedicating one or more subcarriers to being pilot tones that carry known data, receiver 308 selects one or more subcarriers to be carrier tracking subcarriers that carry payload data. Frequency offset analysis using carrier tracking subcarriers that carry payload data increases the spectral efficiency of the carrier tracking techniques compared to techniques that use pilot tones carrying known training data. As referred to herein, a carrier tracking subcarrier is a subcarrier of an OFDM signal that is used to communicate data with a reduced likelihood of errors in data recovery as compared to other subcarriers of the OFDM signal. In at least one embodiment of receiver 308, carrier tracking module 550 is configured to generate receiver parameters (e.g., frequency offset adjustment, timing adjustment, and/or FEQ tap adjustment) for receiver elements (e.g., de-rotator 512, timing interpolator 510, and/or FEQ 546, respectively) to improve carrier tracking and received carrier orthogonality based on payload data received using one or more carrier tracking subcarriers.

Referring to FIGS. 5, 6A, 6B, and 6C, in at least one embodiment, receiver 308 receives N packets of known data over a particular link (602) and a performance estimator (e.g., signal-to-noise ratio (SNR) estimator 518) generates performance (e.g., SNR) estimates for each subcarrier of the OFDM signal based on the N received packets received over that particular link (604). A carrier tracking subcarrier selector (e.g., carrier tracking subcarrier selector 519) uses that performance estimate to identify a predetermined number of subcarriers (e.g. $N_P$ subcarriers) to be designated as carrier tracking subcarriers for the link (606). The predetermined number of subcarriers may be a fixed number of subcarriers or may be determined based on a programmable value received from a storage device, or by other suitable technique. In at least one embodiment, carrier tracking subcarrier selector 519 identifies the $N_P$ subcarriers with the best performance characteristics (e.g., highest SNR estimate values) to be designated as carrier tracking subcarriers and provides the designation to bit loading module 520. Other embodiments of carrier tracking subcarrier selector 519 select $N_P$ subcarriers based on subcarrier SNR estimate values, proximity of the subcarrier to an edge of the frequency band of the OFDM signal, and/or a predetermined amount of spacing between carrier tracking subcarriers to provide at least some frequency diversity. For example, the $N_P$ subcarriers are selected from those subcarriers having the highest SNR values that are at least a predetermined number of subcarriers from the edge of the frequency band and are spaced at least k subcarriers from the next adjacent carrier tracking subcarrier, where k is an integer.

In at least one embodiment of receiver 308, bit loading module 520 assigns a number of bits to each subcarrier (607). Bit loading module 520 determines the throughput of a link by assigning a particular number of bits to be transported by each individual subcarrier of the OFDM signal. For example, bit loading module 520 attempts to maximize a transport capacity of a particular link. In at least one embodiment, bit loading module 520 approximates a water-filling algorithm. In at least one embodiment, bit loading module 520 uses a gap approximation on a subcarrier-by-subcarrier basis in an iterative manner or uses other suitable technique to allocate bits to subcarriers. In general, the bit loading technique determines a number of bits that may be supported by a particular subcarrier based on a performance estimate for that particular subcarrier and a target performance margin, which is determined based on a target bit error rate (BER) and a target coding scheme. In at least one embodiment of bit loading module 520, a signal-to-noise ratio (SNR) estimate is used as the performance estimate and indicator of subcarrier quality. As the SNR estimate for a particular subcarrier increases, the number of bits that can be supported by the particular subcarrier increases for the target performance margin.

In at least one embodiment of bit loading module 520, those subcarriers designated as carrier tracking subcarriers use a different performance margin than other subcarriers. In at least one embodiment of bit loading module 520, the target performance margin used for a carrier tracking subcarrier is substantially greater than (i.e., at least 3 dB greater, e.g., 8 dB greater) the target performance margin for other subcarriers. Accordingly, by using the substantially greater performance margin to determine the bit loading on carrier tracking subcarriers, the number of bits allocated to a subcarrier that is designated as a carrier tracking subcarrier is reduced from the number of bits allocated to that subcarrier had it not been designated as a carrier tracking subcarrier. For example, the number of bits allocated when a subcarrier is designated as a carrier tracking subcarrier is at least one bit less than the number of bits allocated to that subcarrier had it not been designated as a carrier tracking subcarrier. Increasing the performance margin for the carrier tracking subcarrier and reducing the number of bits allocated to that subcarrier increases the likelihood of correct decisions when demapping symbols received using the carrier tracking subcarrier. Thus, the increased performance margin reduces the likelihood of errors during recovery of data received over the carrier tracking subcarrier, thereby facilitating use of unknown data for carrier tracking.

Figure 6A:
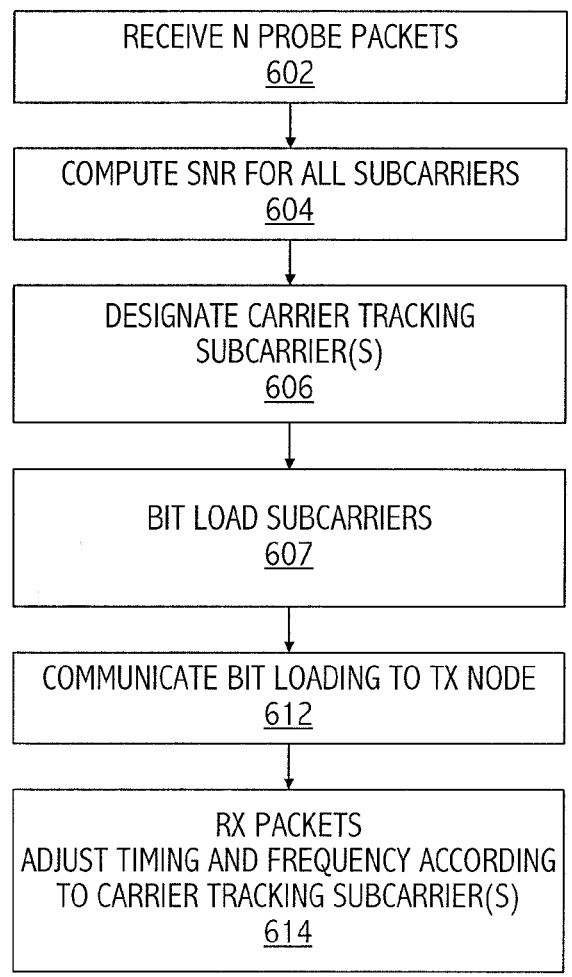
FIGS. 6A, 6B, and 6C illustrate information and control flows for selecting carrier tracking subcarriers for use in a carrier tracking technique consistent with at least one embodiment of the invention.
Figure 6B:
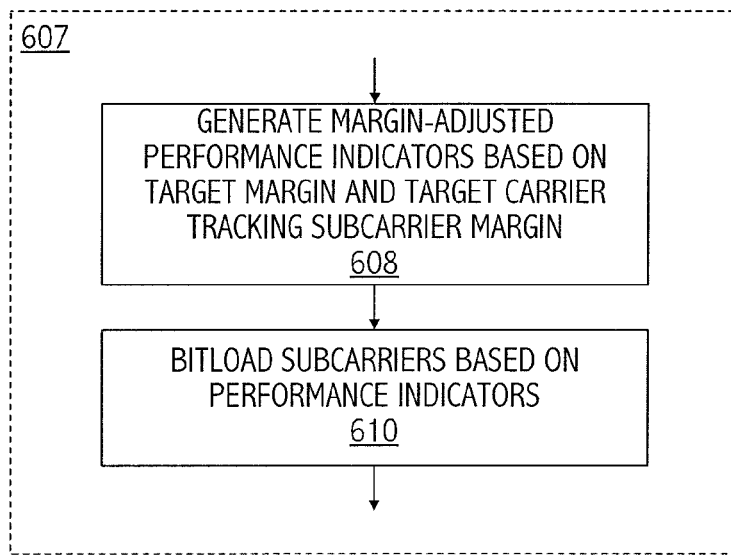

Referring to FIG. 6B, in at least one embodiment, bit loading module 520 generates margin-adjusted performance indicators based on the SNR estimates (608). In at least one embodiment, bit loading module 520 accesses entries of a predetermined table indicating a number of bits to be allocated for corresponding margin-adjusted performance indicators. For those subcarriers designated as carrier tracking subcarriers, bit loading module 520 uses another predetermined table based on the target carrier tracking subcarrier performance margin to determine a number of bits allocated to the carrier tracking subcarriers. The margin-adjusted performance indicators for those subcarriers designated as carrier tracking subcarriers are generated by subtracting a target carrier tracking subcarrier margin value from the SNR estimate corresponding to those designated subcarriers and another target margin value is subtracted from the SNR estimates corresponding to other subcarriers. Then, bit loading module 520 allocates a number of bits to each subcarrier based on those margin-adjusted performance indicators for each subcarrier (610). Note that the order of operations of FIGS. 6A and 6B are exemplary only and the bit loading of carrier tracking subcarriers and other subcarriers may be performed using variations of the operations of FIGS. 6A and 6B.

Figure 6C:
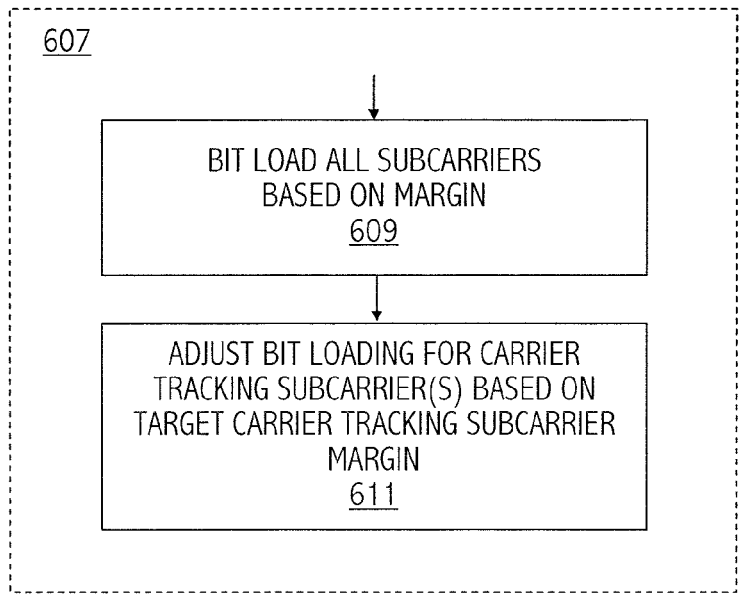

For example, referring to FIG. 6C, in another embodiment, bit loading module 520 performs a bit loading of all subcarriers using a target performance margin and performance indicators for all subcarriers (609). Then, bit loading module 520 adjusts the bit loading for the designated carrier tracking subcarriers based on corresponding performance indicators and a target carrier tracking performance margin (611). Bit loading module 520 accesses entries of a carrier tracking subcarrier bit loading table indicating numbers of bits to be allocated for corresponding margin-adjusted performance indicators for carrier tracking subcarriers and accesses another bit loading table for other subcarriers. The carrier tracking subcarrier bit loading table is based on a target carrier tracking performance margin and the other table used for other subcarriers is based on a target performance margin that is substantially less than the target carrier tracking performance margin. The carrier tracking subcarrier table indicates numbers of bits for margin-adjusted performance indicators that result in an increased likelihood that decisions made by demapping symbols received using the carrier tracking subcarrier are correct as compared to the other numbers of bits provided by the other bit loading table and used for bit loading of the other subcarriers.

Figure 7:
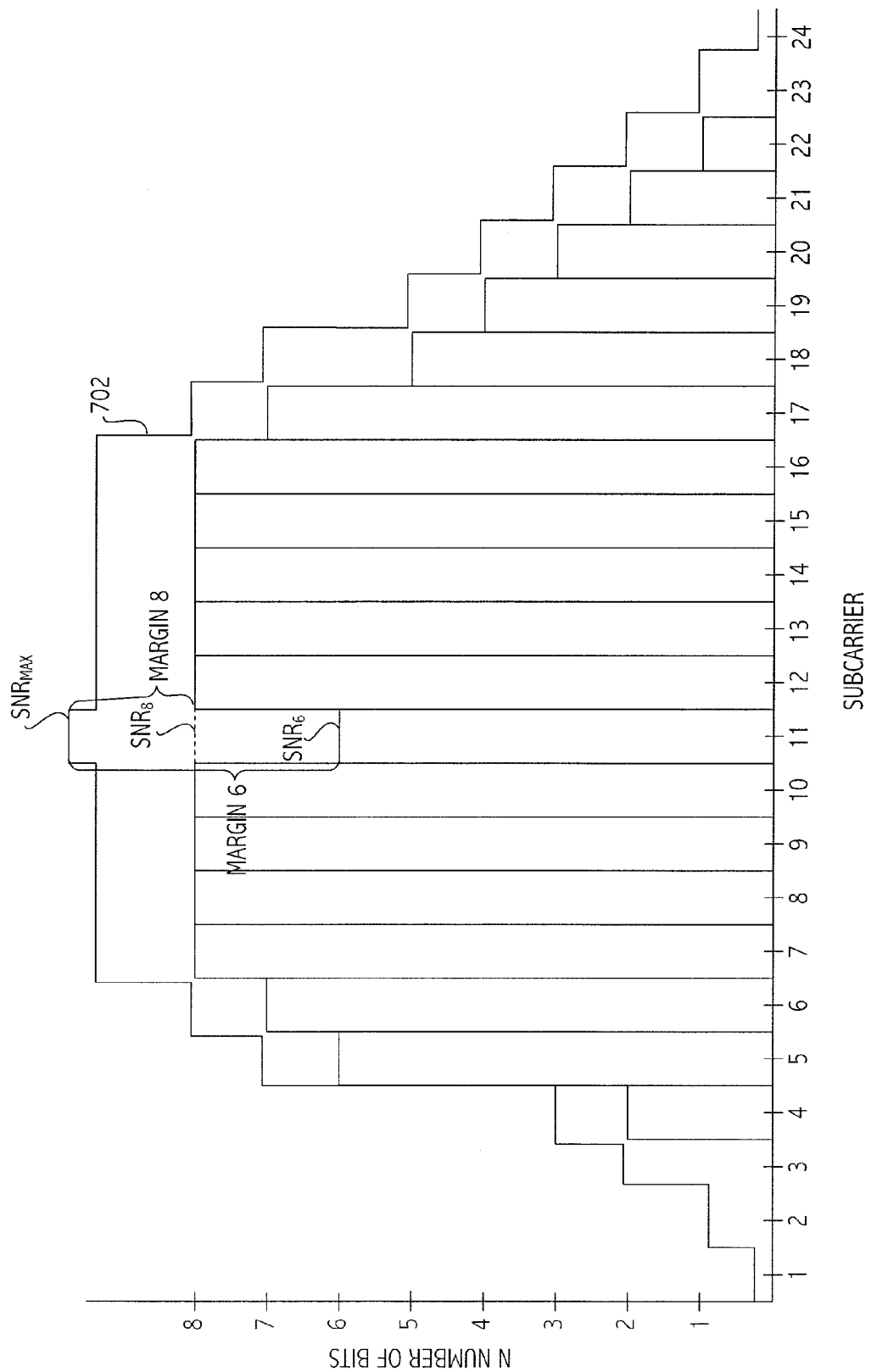
FIG. 7 illustrates an exemplary signal-to-noise ratio estimate and exemplary bit allocations consistent with at least one embodiment of the invention.

Referring to FIG. 7, an exemplary performance estimate (e.g., SNR estimate 702) and corresponding bit loadings are illustrated for an OFDM signal including 24 subcarriers consistent with the carrier tracking technique described herein. In at least one embodiment, carrier tracking subcarrier selector 519 determines, based on SNR values 702, that subcarrier 11 has the greatest SNR estimate value ($SNR_{MAX}$) and designates subcarrier 11 as a carrier tracking subcarrier. Carrier tracking subcarrier selector 519 communicates this designation to bit loading module 520, which bit loads the subcarriers. Subcarrier 11 is bit loaded using a target carrier tracking subcarrier margin value to obtain a greater performance margin than other subcarriers, which are bit loaded using a target margin value that is substantially less than the target carrier tracking subcarrier margin value. Rather than being allocated 8 bits, which requires an SNR of at least $SNR_8$ and results in a performance margin of $MARGIN_8$ (where $MARGIN_8=SNR_{MAX}-SNR_8$) for subcarrier 11, bit loading module 520 allocates subcarrier 11 with only 6 bits of data, which only requires an SNR of at least $SNR_6$ and results in a performance margin of $MARGIN_6$ (where $MARGIN_6=SNR_{MAX}-SNR_6$) for subcarrier 11. Note that margin values will vary according to system parameters and other numbers of carrier tracking subcarriers may be used.

Referring back to FIG. 6A, the node transmits the resulting bit loading to a corresponding transmitting node for use during subsequent data transmission. The node also stores the resulting bit loading in receiver 308 for use during subsequent data recovery operations (612). During subsequent data communications, a carrier tracking module generates system adjustment parameters for the link based on data received using the carrier tracking subcarriers (614).

Figure 8:
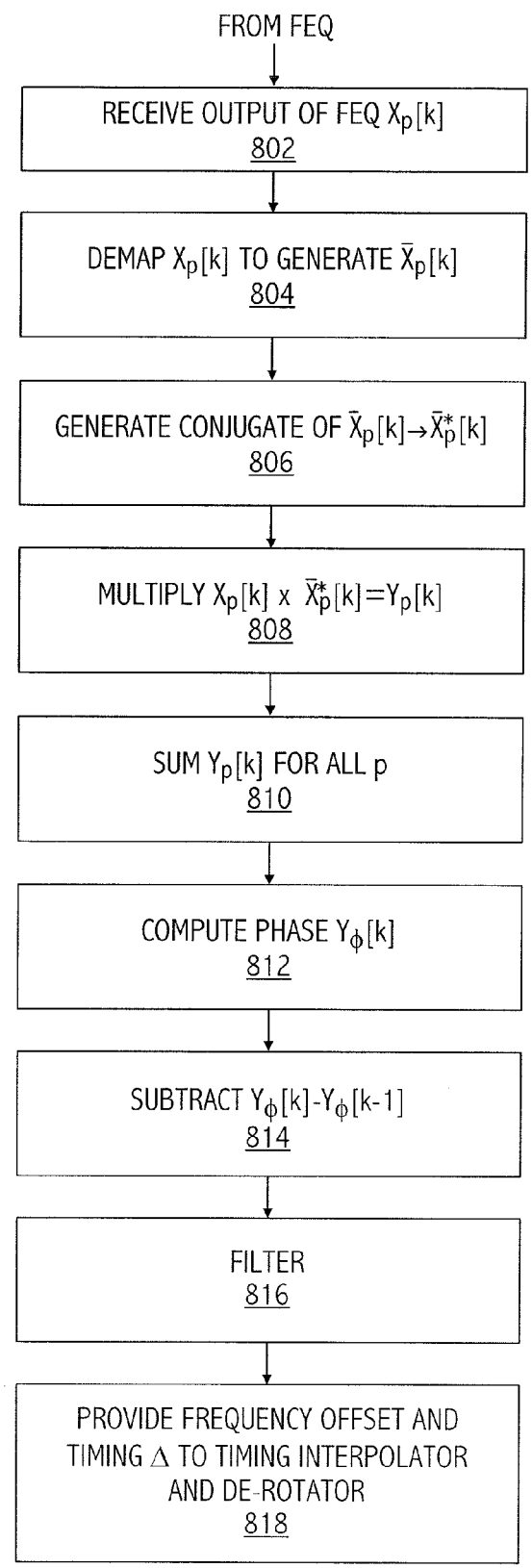
FIG. 8 illustrates information and control flows for generating a frequency offset and timing adjustment based on data communicated over carrier tracking subcarriers for a carrier tracking technique consistent with at least one embodiment of the invention.
Figure 9:
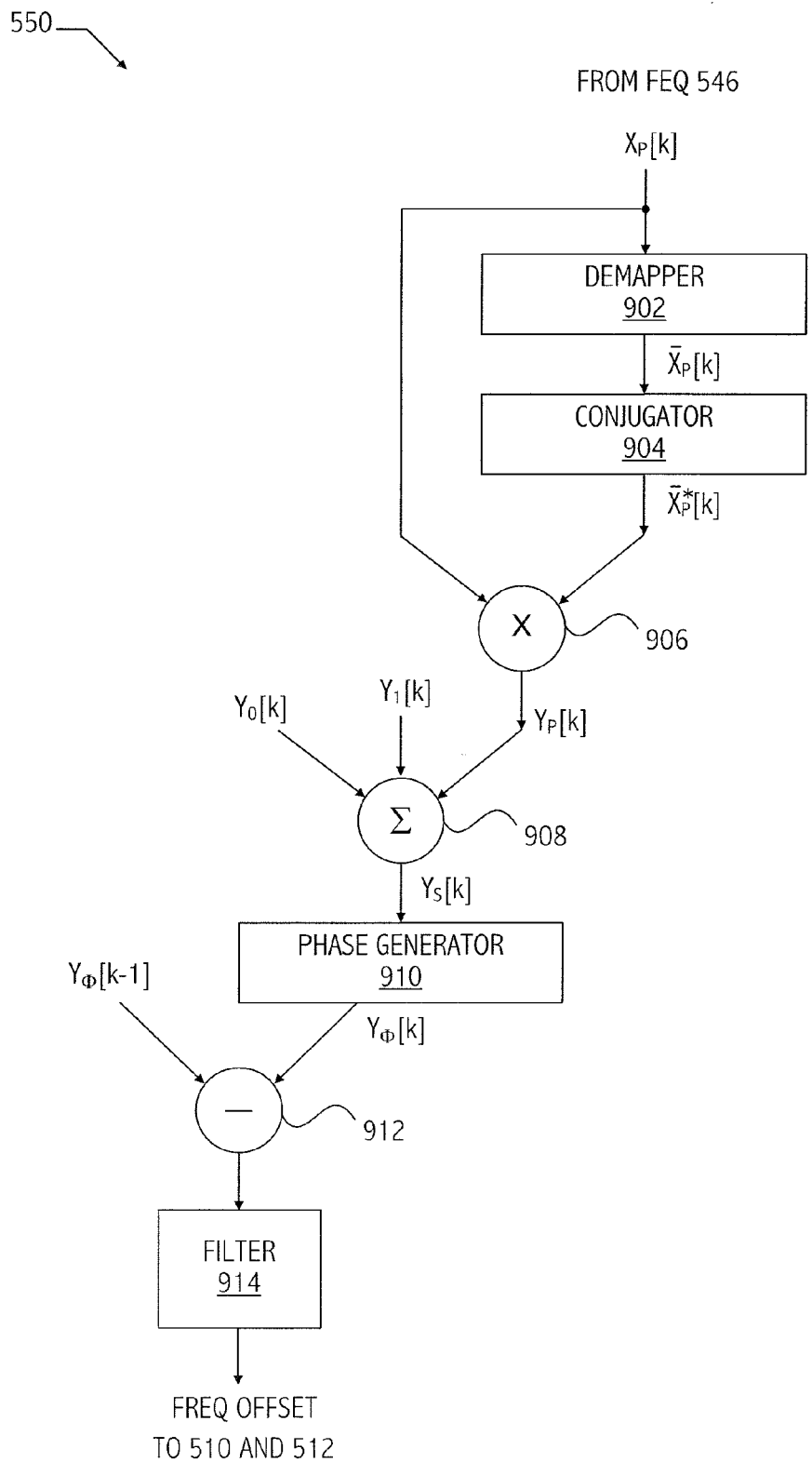
FIG. 9 illustrates a functional block diagram of an exemplary carrier tracking module consistent with at least one embodiment of the invention.

Referring to FIGS. 5, 8, and 9, in at least one embodiment of receiver 308, carrier tracking module 550 receives one or more symbols (e.g., P symbols, $X_p[k]$, where $1 \le p \le P$, where p and P are integers) received over P corresponding carrier tracking subcarriers and processes those symbols to determine receiver parameters for the link. Carrier tracking module 550 receives $X_p[n]$ from FEQ 546 (802). Demapper 902 demaps each symbol to generate $\overline{X}_p[k]$(804). For example, for each received symbol value for a particular subcarrier, carrier tracking module 550 determines a closest symbol value of the possible symbol values for a particular subcarrier modulation scheme. Conjugator 904 generates $\overline{X}_p^*[k]$, which is the complex conjugate of the demapped symbol $\overline{X}_p[k]$(806). Multiplier 906 multiplies the complex conjugate of the demapped symbol with the original symbol received from FEQ 546 (i.e., $X_p[k] \times \overline{X}_p^*[k]=Y_p[k]$), to generate a resultant vector (808). If there is no frequency offset, then the corresponding complex value will be completely real and have no imaginary component. Summer 908 then sums weighted products for all carrier tracking subcarriers ($Y_0[k]+Y_1[k]+ \ldots +Y_p[k]$) (810) and then phase generator 910 computes the phase of the sum to generate a single phasor indicative of a total frequency offset, $Y_\phi[k]$(812). In at least one embodiment of carrier tracking module 550, rather than computing weighted phasors and summing the weighted phasors to compute the frequency offset, carrier tracking module 550 determines individual phasors for each designated carrier tracking subcarrier and averages those phasors to determine the frequency offset.

In at least one embodiment of carrier tracking module 550, difference module 912 determines a difference from a prior symbol in time $Y_\Delta[k]=Y_\phi[k]-Y_\phi[k-1]$ to determine the time varying change in frequency offset (814). Filter 914 (e.g., a low pass filter) provides the resulting phase difference to timing interpolator 510 and de-rotator 512. In at least one embodiment, filter 914 has programmable parameters, which may be programmed to achieve a particular bandwidth and sensitivity of the carrier tracking. For example, in embodiments of carrier tracking module 550 configured for a wider bandwidth, the carrier tracking is noisier, but tracks frequency offset changes faster. Similarly, in embodiments of carrier tracking module 550 configured for a narrower bandwidth, the carrier tracking results in improved frequency offset estimates, but tracks changes slower. The output of filter 914 is an indicator of a frequency offset. Note that in other embodiments of receiver 308, carrier tracking module 550 receives the OFDM frequency domain symbols from other modules of the receiver path (e.g., demappper/descrambler 542, decoder 540, decryptor 538, or other suitable module) and functions of carrier tracking module 550 are adjusted based on the processing state of the OFDM frequency domain symbols.

In at least one embodiment of receiver 308, a sampling clock and a carrier signal are generated by the same source. Accordingly, in at least one embodiment, carrier tracking module 550 provides indicators of time-varying frequency offset to timing interpolator 510 and de-rotator 512, which adjust a sampling frequency offset and carrier frequency offset, respectively, of receiver 308. In at least one embodiment, carrier tracking module 550 provides an indication of carrier frequency offset to FEQ 546. Accordingly, de-rotator 512 compensates for the time-varying carrier frequency offset using a complex multiply of the OFDM signal. FEQ 546 adjusts the FEQ taps according to a common phase error of the carrier tracking subcarriers. For example, FEQ 546 multiplies each FEQ tap by an average phase error (e.g., using a single phasor multiply for each FEQ tap) to de-rotate by the common phase error to have a net phase error of zero after the correction. Thus, carrier tracking techniques described herein use carrier tracking subcarriers that carry payload data to determine a frequency offset indicator, which is used to compensate for frequency offsets during data communications over a particular link. The carrier tracking techniques described herein increase the spectral efficiency of the carrier tracking techniques as compared to other techniques that use pilot tones carrying known training data.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in embodiments in which a receiver receives OFDM communications over a channel including coaxial cable, one of skill in the art will appreciate that the teachings herein can be utilized with devices consistent with OFDM communications over channels including other wireline or wireless channels. Variations and modifications of the embodiments disclosed herein, may be made based on the description set forth herein, without departing from the scope and spirit of the invention as set forth in the following claims.

What is claimed is:

1. A method comprising:
   selecting a plurality of carrier tracking subcarriers from a plurality of subcarriers of an orthogonal frequency division multiplexing (OFDM) signal partially based on a predetermined number indicating a number of subcarriers between adjacent carrier tracking subcarriers of the plurality of carrier tracking subcarriers; and communicating at least a portion of a frame of data using the OFDM signal having first numbers of bits per symbol of the frame of data modulating the plurality of carrier tracking subcarriers of the OFDM signal and second numbers of bits per symbol of the frame of data modulating the other subcarriers of the plurality of subcarriers, wherein the first numbers of bits per symbol are based on corresponding performance estimates for the carrier tracking subcarriers and numbers of bits that provide a first target performance margin, and wherein the second numbers of bits per symbol are based on corresponding performance estimates for the other subcarriers and corresponding numbers of bits that provide a second target performance margin.

2. The method, as recited in claim 1, further comprising:
allocating the first numbers of bits per symbol to the first carrier tracking subcarriers based on the first target performance margin; and
allocating the second numbers of bits per symbol to the other subcarriers based on the second target performance margin.

3. The method, as recited in claim 1, wherein the first target performance margin is substantially greater than the second target performance margin.

4. The method, as recited in claim 1, further comprising:
communicating indications of the first numbers of bits per symbol allocated to the first carrier tracking subcarriers and the second numbers of bits per symbol allocated to the other subcarriers.

5. The method, as recited in claim 1, wherein the selecting comprises:
determining as the carrier tracking subcarriers, subcarriers of the plurality of subcarriers having maximum performance estimates.

6. The method, as recited in claim 1, further comprising:
generating the performance estimates for the plurality of subcarriers based on known received symbols.

7. The method, as recited in claim 1, further comprising:
generating a frequency offset indicator based on bits of the frame of data received using the carrier tracking subcarriers; and
adjusting received data of an OFDM receiver based on the frequency offset indicator.

8. The method, as recited in claim 1, wherein the first target performance margin is at least 3 dB greater than the second target performance margin.

9. The method, as recited in claim 1, wherein the portion of the frame of data is-received from a Medium Access Control layer and the performance estimate is a target bit error rate associated with a target coding scheme.

10. The method, as recited in claim 1, wherein the predetermined number is an integer selected to provide frequency diversity to the plurality of carrier tracking subcarriers.

11. The method, as recited in claim 1, wherein the selecting is further based on a second predetermined number indicating a number of subcarriers from an edge of the frequency band.

12. An apparatus comprising:
a select module configured to select a plurality of carrier tracking subcarriers from a plurality of subcarriers of an orthogonal frequency division multiplexing (OFDM) signal based on a plurality of corresponding performance estimates for the plurality of subcarriers and a predetermined number indicating a number of subcarriers between adjacent carrier tracking subcarriers of the plurality of carrier tracking subcarriers;

a bit allocation module configured to allocate numbers of bits per symbol to the carrier tracking subcarriers based on corresponding performance estimates for the carrier tracking subcarriers and a first target performance margin and configured to allocate numbers of bits per symbol to other subcarriers of the plurality of subcarriers based on corresponding performance estimates for the other subcarriers and a second target performance margin;

a carrier tracking module configured to generate a frequency offset indicator based on a portion of a frame of data received using the carrier tracking subcarriers; and at least one module configured to provide the portion of the frame of data received using the plurality of carrier tracking subcarriers and the other subcarriers to a processor.

13. The apparatus, as recited in claim 12, wherein the first target performance margin is substantially greater than the second target performance margin.

14. The apparatus, as recited in claim 12, wherein the first target performance margin is at least 3 dB greater than the second target performance margin.

15. The apparatus, as recited in claim 12, further comprising:
a performance estimator configured to generate the plurality of corresponding performance estimates for the plurality of subcarriers.

16. The apparatus, as recited in claim 12, wherein the select module is configured to identify, as the carrier tracking subcarriers, subcarriers having maximum performance estimates of the plurality of corresponding performance estimates.

17. The apparatus, as recited in claim 12, wherein the predetermined number is an integer selected to provide frequency diversity to the plurality of carrier tracking subcarriers.

18. A method comprising:
communicating at least a portion of a frame of data using an orthogonal frequency division multiplexing (OFDM) signal having a first number of bits of the frame of data per symbol modulating a carrier tracking subcarrier of a plurality of subcarriers of the OFDM signal and numbers of bits of the frame of data per symbol of the frame of data modulating other subcarriers of the plurality of subcarriers;

determining the first number of bits of the frame of data per symbol based on a maximum number of data bits that provides a first target performance margin based on a corresponding performance estimate for the carrier tracking subcarrier; and determining the numbers of bits of the frame of data per symbol based on maximum numbers of data bits that provide a second target performance margin based on corresponding performance estimates for the other subcarriers.

* * * * *